(12) United States Patent
Norman (10) Patent No.: US 7,726,700 B2
(45) Date of Patent: Jun. 1, 2010

(54) PIPE COUPLING

(75) Inventor: Jamie Norman, Toronto (CA)

(73) Assignee: Cambridge Brass, Inc., Cambridge, Ontario (CA)

( * ) Notice: Subject to any disclaimer, the term of this patent is extended or adjusted under 35 U.S.C. 154(b) by 453 days.

(21) Appl. No.: 11/018,597

(22) Filed: Dec. 21, 2004

(65) Prior Publication Data

US 2005/0189766 A1  Sep. 1, 2005

(30) Foreign Application Priority Data

Feb. 27, 2004  (CA) ................................. 2459637

(51) Int. Cl.
*F16L 21/06* (2006.01)

(52) U.S. Cl. ..................... 285/322; 285/342

(58) Field of Classification Search ............... 285/249, 285/322–324, 243, 247, 257, 40, 382.7, 342, 285/343
See application file for complete search history.

(56) References Cited

U.S. PATENT DOCUMENTS

| | | | | |
|---|---|---|---|---|
| 2,394,351 A | * | 2/1946 | Wurzburger | ................ 285/341 |
| 2,644,700 A | * | 7/1953 | Woodling | .................... 285/343 |
| 3,186,740 A | * | 6/1965 | Lee | ............................. 285/101 |
| 3,445,128 A | | 5/1969 | Teeters | |
| 3,498,647 A | * | 3/1970 | Schroder | ..................... 285/343 |
| 3,724,879 A | * | 4/1973 | Snyder, Jr. | .................. 285/342 |
| 4,513,172 A | * | 4/1985 | Matsui | ........................ 174/655 |
| 4,684,157 A | | 8/1987 | Smith | |
| 4,848,802 A | | 7/1989 | Wolf et al. | |
| 4,871,196 A | | 10/1989 | Kingsford | |
| 4,878,697 A | | 11/1989 | Henry | |
| 4,887,847 A | | 12/1989 | Barnoach | |
| 4,995,646 A | * | 2/1991 | Johnston et al. | ........... 285/382.7 |
| 5,028,078 A | | 7/1991 | Schwarz et al. | |
| 5,121,949 A | | 6/1992 | Reese | |
| 5,181,751 A | * | 1/1993 | Kitamura | ................... 285/322 |
| 5,242,199 A | | 9/1993 | Hann et al. | |
| 5,322,331 A | | 6/1994 | Waldschmidt et al. | |
| 5,351,998 A | | 10/1994 | Behrens et al. | |
| 5,375,887 A | | 12/1994 | Johnson | |
| 5,558,375 A | | 9/1996 | Newman | |
| 5,580,105 A | | 12/1996 | Miller, Jr. et al. | |
| 5,584,513 A | | 12/1996 | Sweeny et al. | |
| 5,593,186 A | | 1/1997 | Harris | |
| 5,622,393 A | | 4/1997 | Elbich et al. | |
| 5,882,050 A | | 3/1999 | Williams et al. | |
| 5,954,375 A | | 9/1999 | Trickle et al. | |
| 5,957,509 A | * | 9/1999 | Komolrochanaporn | ... 285/382.7 |
| 6,019,399 A | | 2/2000 | Sweeney | |
| 6,044,868 A | | 4/2000 | Gretz et al. | |
| 6,102,442 A | | 8/2000 | Gretz | |
| 6,131,963 A | | 10/2000 | Williams et al. | |
| 6,378,915 B1 | * | 4/2002 | Katz | .......................... 285/342 |
| 6,416,085 B1 | | 7/2002 | Markovic | |

(Continued)

*Primary Examiner*—Aaron M Dunwoody
(74) *Attorney, Agent, or Firm*—Wood, Phillips, Katz, Clark & Mortimer (57) ABSTRACT

A coupling for connecting pipes to externally threaded fittings and stubs. The coupling comprises a coupling body, a gripper, gripper engagement means for causing the gripper to engage the pipe, a gasket, gasket engagement means for causing the gasket to seal around the pipe, gripper retention means for retaining the gripper within the interior of the coupling body during handling thereof, and gasket retaining means for retaining the gasket within the interior of the coupling body during handling thereof.

25 Claims, 7 Drawing Sheets

U.S. PATENT DOCUMENTS

| | | |
|---|---|---|
| 6,438,814 B1 | 8/2002 | Seymour et al. |
| 6,467,819 B2 | 10/2002 | Seifert et al. |
| 6,502,866 B1 | 1/2003 | Hujisawa et al. |
| 7,469,936 B2 | 12/2008 | Norman |
| 2002/0024218 A1 | 2/2002 | Manuli |
| 2002/0109353 A1 | 8/2002 | Guest |
| 2002/0195819 A1 | 12/2002 | Sagaser |
| 2003/0001385 A1 | 1/2003 | Favre et al. |
| 2003/0006610 A1 | 1/2003 | Werth |
| 2003/0034647 A1 | 2/2003 | Hollingsworth |
| 2003/0080557 A1 | 5/2003 | Benavides et al. |
| 2003/0107216 A1 | 6/2003 | Gibson |
| 2006/0163872 A1 | 7/2006 | Norman |

* cited by examiner

PIPE COUPLING

This application claims priority from Canadian Patent application number 2,459,637 filed on Feb. 27, 2004.

FIELD OF THE INVENTION

The invention relates to pipe couplings, and in particular to couplings used to connect pipes to fittings such as valves, adapters or other fittings.

BACKGROUND OF THE INVENTION

Particularly in the plumbing and waterworks industries, situations frequently arise during installation or repair of piping where it is necessary to connect pipes to various fittings such as corporation valves, curb valves and various adapters. These situations can arise for example during water service line installation or repair. Such piping can include service tubes and may be made of polyvinylchloride (PVC) or galvanized steel for example.

Typically, such fittings are provided with a stub, usually externally threaded, for receiving a sealed fluid communicating connection with the pipe. The threading on such stubs are typically of an industry standard such as corporation fitting thread, to allow similarly-threaded couplings to be mounted thereon.

Such pipe-fitting couplings typically come in two main forms. In a first form the coupling is integral with the pipe. The present invention is directed to the second form wherein the coupling is a separate device which clamps on to, or is otherwise sealingly affixed to the end of the pipe. In either case the end of the coupling intended to engage the fitting stub is provided with internal threading and the coupling is connected to the fitting stub by turning one relative to the other thereby engaging the internal threading of the coupling with the external threading of the stub.

A typical manner in which such a separate coupling is used to connect a pipe to a fitting stub is as follows. First a coupling body, having internal threads at a forward end for engaging the external threads of the stub, and a constricted rearward end, is slid on to the pipe, rearward end first. A combination of various internal elements including seals and camming or gripping means are then slid on to the pipe. During this process it is imperative that each of the internal elements be placed on the pipe in the correct order and in the correct orientation. Failure to do so will typically result in failure of the connection. Finally, the coupling body is screwed onto the stub trapping and compressing the seals and the camming or gripping means. In particular, the constricted rearward end of the coupling body presses the seals and camming or gripping means against the end of the stub, or against the side of the pipe. The compressed seals create a hydrostatic seal between the stub and the pipe, while the camming or gripping means are urged to a locking and restraining position preventing the pipe from being pulled out of the coupling inadvertently. Using such a coupling, a secure pressure-sealed connection is made. An example of such a coupling for plumbing applications is described in U.S. Pat. No. 5,580,105 Miller Jr. et al. issued Dec. 3, 1996.

One difficulty with such couplings is the need for the user to handle a number of small elements (typically the internal elements) during installation. This can result in frustration on the part of the user while he fumbles with the various parts to ensure that they are installed in the correct order and orientation. As noted above, if the user fails to install these parts in the correct order and orientation, the connection can fail resulting in leakage. This disadvantage is particularly acute where installation takes place in difficult conditions, for example where the fitting is located in an awkward location, or where the installation is taking place on waterworks, often with the user standing in a wet and muddy hole where fingers are slippery and where a dropped part is irretrievably lost.

Another difficulty with such couplings is that the camming or gripping means are typically unitary circumferentially, or consist of a small number of wide grips spaced circumferentially. Thus if a unitary camming or gripping means fails, the coupling itself fails. Similarly, if one of a small number of grips fails, the strength of the coupling will be compromised. Further, with a unitary camming or gripping means or with wide grips, it is difficult to achieve positive attachment to pipes which are slightly out of round or which have an irregular outer surface (as is often the case with galvanized steel pipes).

Additionally, most present couplings are not reusable since the camming or gripping means used are permanently deformed during use.

Finally, with most present couplings the coupling can easily be under-tightened or over-tightened onto the pipe and/or the fitting, which may result in damage to the pipe, to the fitting, and/or to the coupling and may also result in failure of the coupling.

SUMMARY OF THE INVENTION

This invention provides an improved coupling for connecting pipes to fittings.

The present invention provides a coupling for creating a fluid-conducting connection between a pipe and a stub. The coupling includes a coupling body having a forward end for being secured to the stub, a rearward end for receiving the pipe, and an internal bore. A stub securing means secures the forward end of the coupling body to the stub. A gripper located within the internal bore of the coupling body is provided for gripping the pipe. A gripper retaining means retains the gripper within the coupling body during handling of the coupling body. A gasket located within the internal bore of the coupling body creates a seal around the pipe. A gasket retaining means retains the gasket within the coupling body during handling of the coupling body. A gripper engaging means is provided that causes the gripper to grip the pipe. A gasket engaging means creates a seal with the gasket around the pipe.

BRIEF DESCRIPTION OF THE DRAWINGS

Preferred embodiments of the invention will now be described with reference to the attached drawings in which.

DETAILED DESCRIPTION OF THE PREFERRED EMBODIMENTS

A preferred embodiment of the coupling of the present invention is shown in the attached drawings. In the exemplary application illustrated, the coupling is used to connect a-PVC pipe to a cast brass alloy fitting stub in a waterworks application. The coupling is located between the pipe and the stub.

In this description and in the claims, the terms 'axial" and "axially" are used to describe a direction parallel to a centerline of the pipe once the coupling is installed, while "radial" and "radially" are used to describe a direction perpendicular to and extending from the centerline of the pipe once the coupling is installed. Further, "forward" is used to describe features which are located nearer the fitting stub and away from the pipe once the coupling is installed, while 'rearward" is used to describe features which are located nearer the extended pipe and away from the fitting stub once the coupling is installed.

Figure 1:
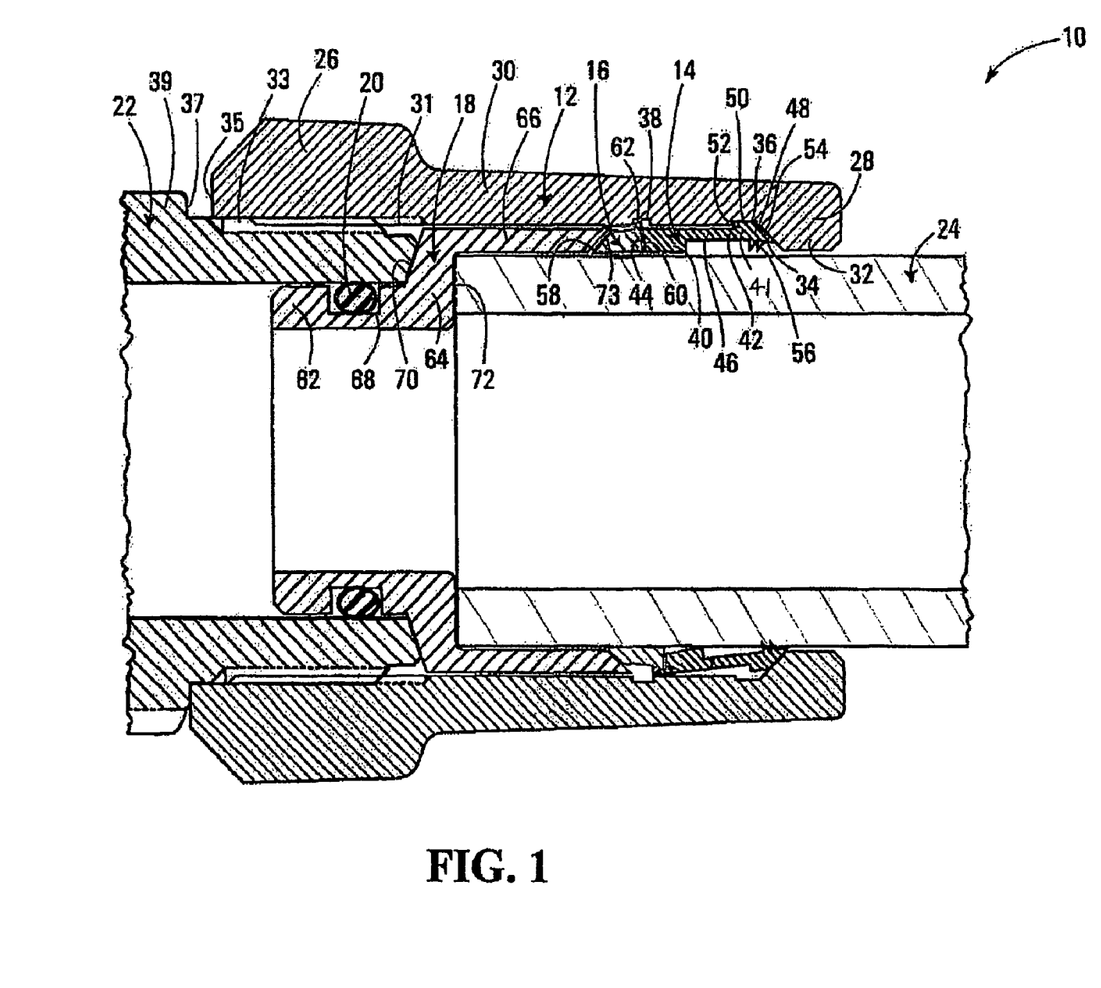
FIG. 1 is a side cross-sectional view of a coupling in accordance with a preferred embodiment of the present invention, installed on a fitting stub and pipe.
Figure 2:
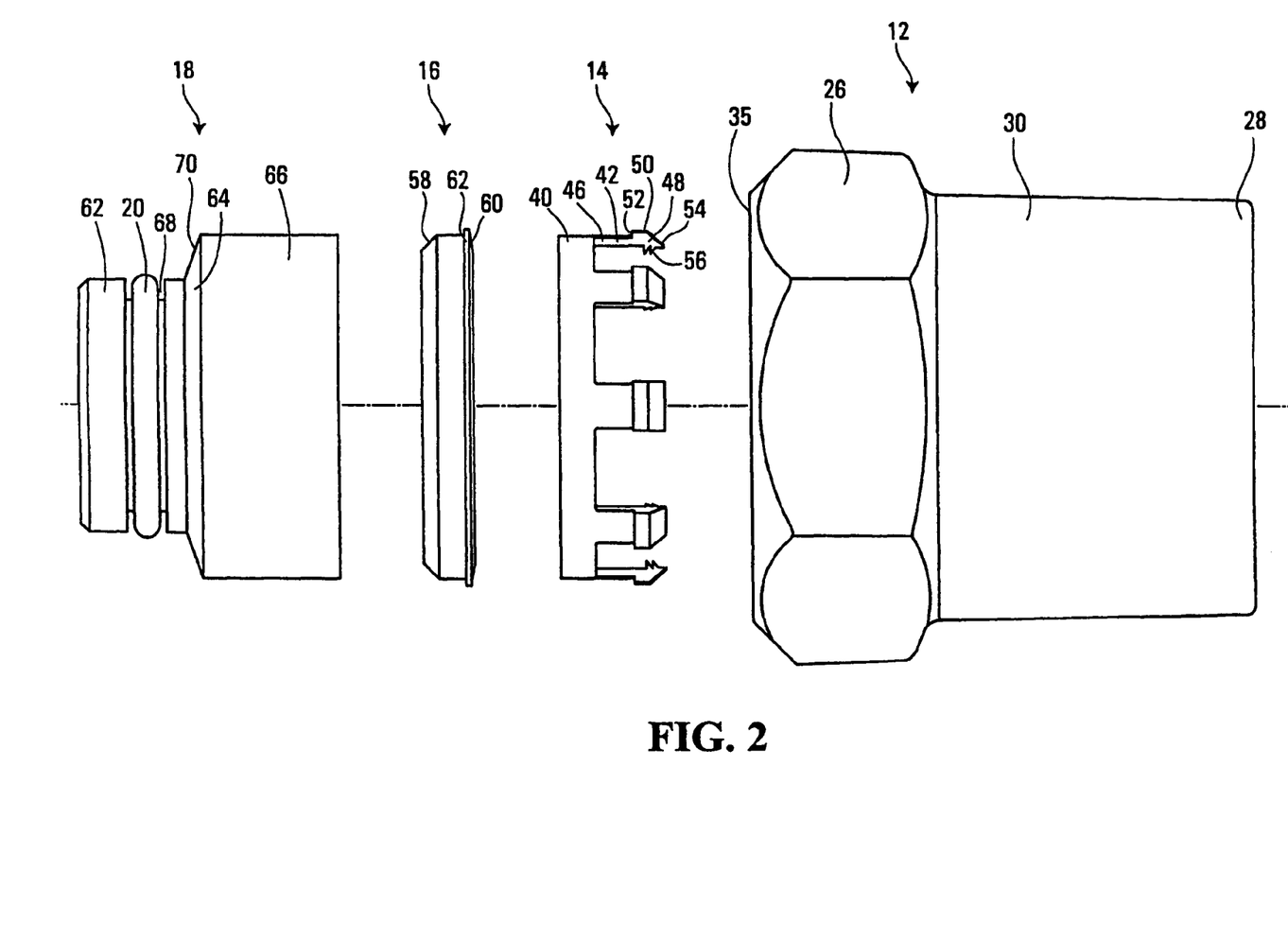
FIG. 2 is an exploded side view of the coupling.
Figure 3:
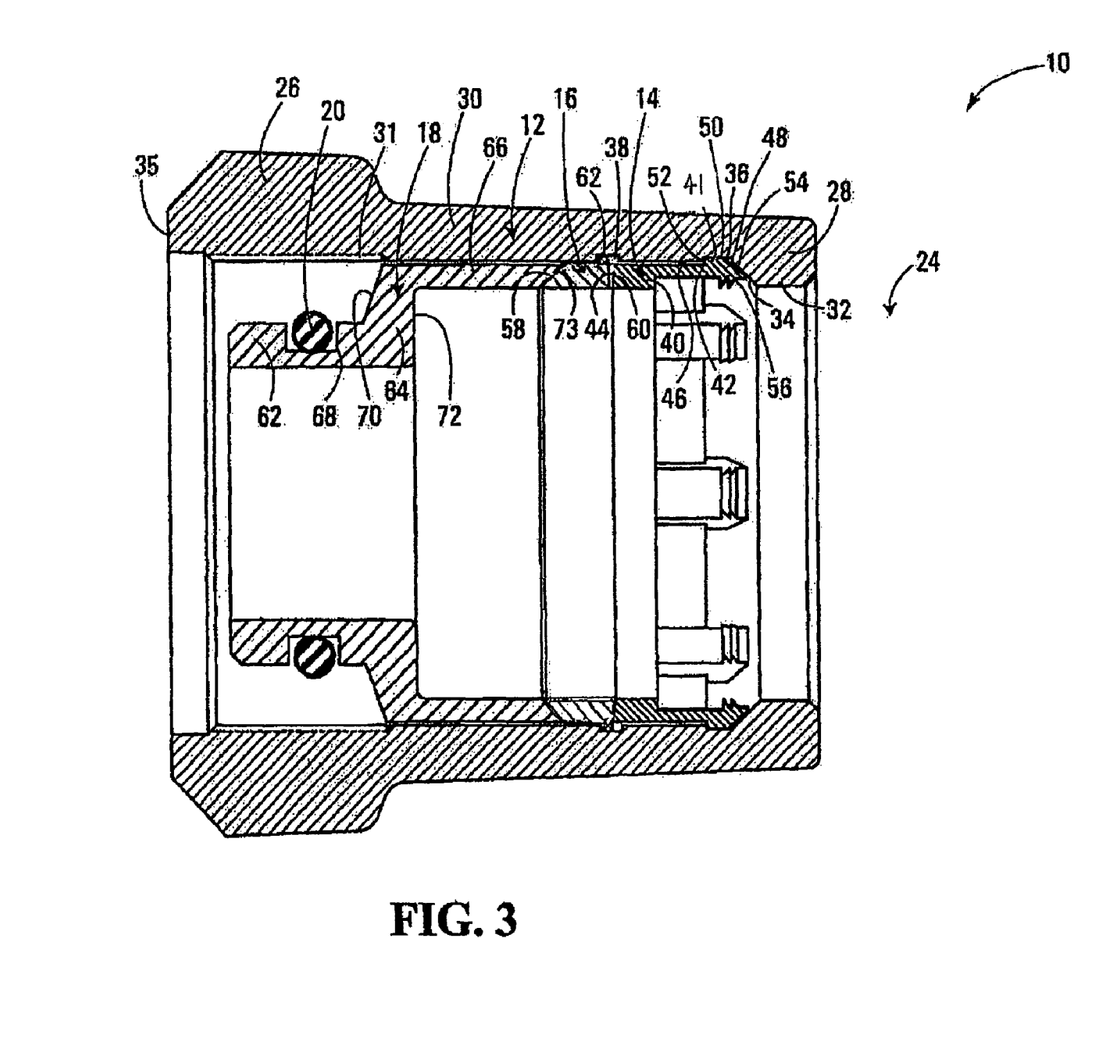
FIG. 3 is a side partial cross-sectional view of the coupling.

FIG. 1 is a cross-sectional view of the coupling 10 installed on a fitting stub 22 and pipe 24. The coupling 10 consists mainly of a coupling body 12, a gripper 14, a gasket 16, and an adapter 18 having a seal 20. The coupling 10 is shown affixed to the stub 22 of a fitting (not shown), and with the pipe 24 installed therein. In this exemplary application, the fitting can be any plumbing or waterworks fitting having an externally-threaded stub 22 having the features described herein, onto which it is desirable to connect the pipe 24. The top half of FIG. 1 depicts the coupling 10 loosely engaging the stub 22 while the bottom half shows the coupling 10 tightened on to the stub 22. FIG. 2 shows an exploded side view of the coupling 10 while FIG. 3 shows a side partial cross-sectional view of the coupling.

Coupling Body

Figure 4:
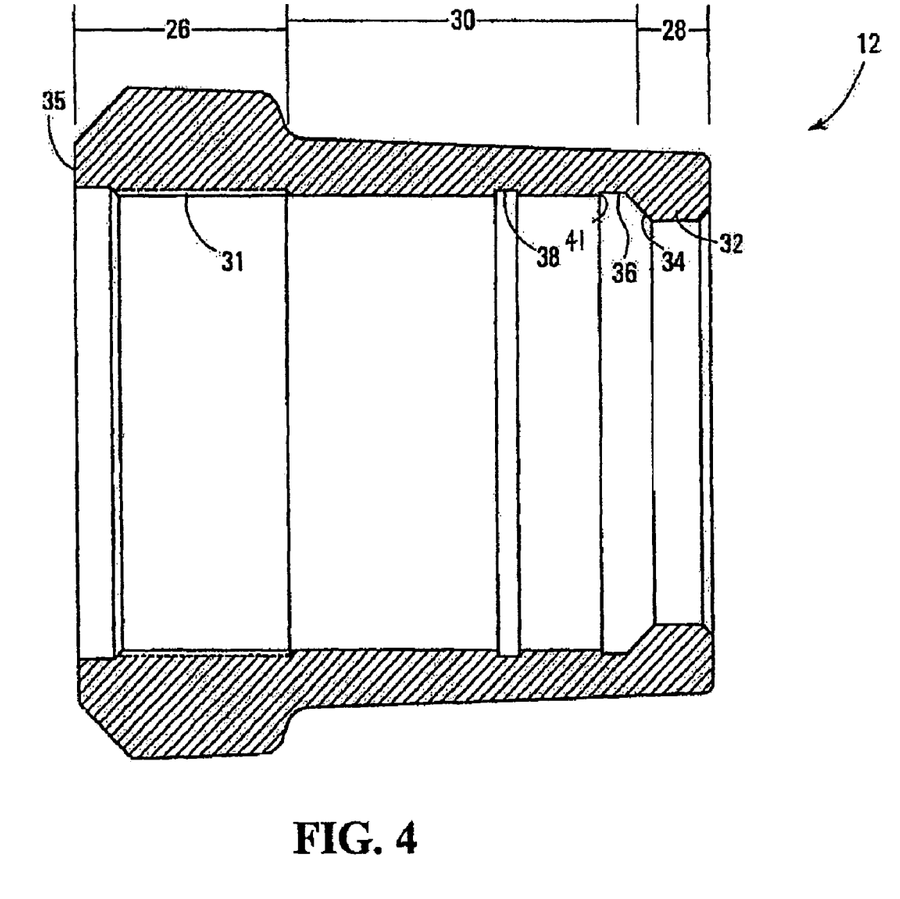
FIG. 4 is a side cross-sectional view of a coupling body of the coupling.

Referring to FIG. 4, the coupling body 12 is made of cast-brass alloy and is generally a hollow cylinder. The coupling body 12 has a nut section 26 at a forward end, a constricted section 28 at a rearward end, and an intermediate section 30 in between.

The nut section 26 of the coupling body 12 is provided with a hexagonal exterior to accommodate hand tightening or tool-tightening of the coupling body 12 on to the fitting stub 22. The interior of the nut section 26 is sized so as to engage an outer surface of the stub 22 and is provided with internal threading 31 which matches the external threading 33 of the stub 22. The threading 31, 33 on the stub 22 and the interior of the nut section 26 is corporation fitting thread, though it is to be understood that other threads can be used. A forward end of the nut section 26 is provided with a flat face 35 which abuts a rearward face 37 of a shoulder 39 on the stub 22 when the coupling body 12 is fully tightened onto the stub 22 as shown in the bottom half of FIG. 1.

The coupling body 12 is provided at its rearward end with a constricted section 28 having an interior constriction 32. The interior constriction 32 is sized so as to fit closely over the pipe 24 and serves to retain the gripper 14, gasket 16 and adapter 18 within the coupling body 12 when the coupling body 12 is screwed onto the stub 22.

Located at an interface between the constricted section 28 and the intermediate section 30 is a gripper constricting slope 34 which is an angled surface in the interior of the coupling body 12 formed as the interior diameter of the coupling body 12 expands from the interior constriction 32 to a gripper retainer groove 36. This gripper-constricting slope 34 causes the gripper 14 to constrict around the pipe 24 once the coupling body 12 is tightened onto the stub 22. The angle of the gripper 20 constricting slope 34 is approximately 45 degrees though it is to be understood that other suitable angles may be utilized.

Adjacent the gripper-constricting slope 34 is the gripper retainer groove 36 which is an interior circumferential groove formed in the coupling body 12 and which has a square forward face 41. The gripper retaining groove 36 retains the gripper 14 in place within the coupling body 12.

In the interior of the intermediate section 30 of the coupling body 12, and spaced from the gripper retainer groove 36 is a gasket retaining groove 38 which is an internal circumferential groove which serves to retain the gasket 16 in place within the coupling body 12.

Gripper

Figure 5:
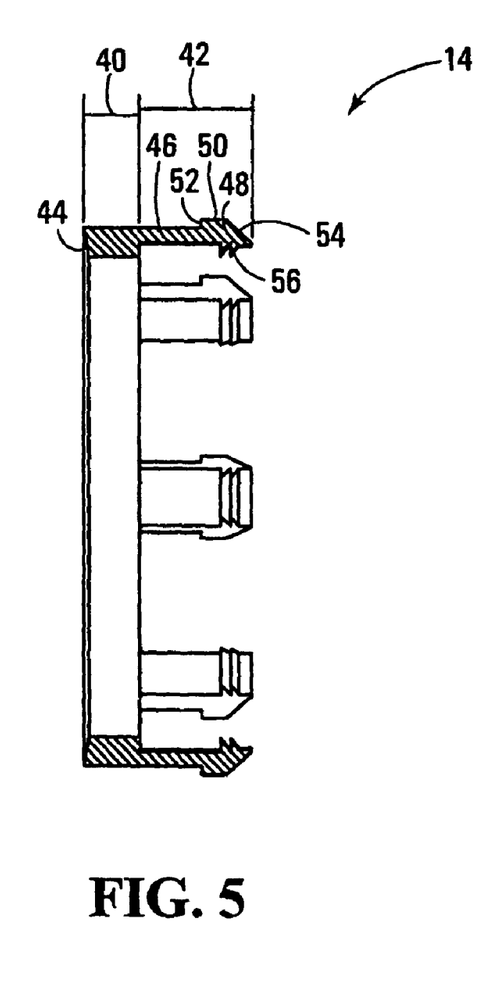
FIG. 5 is a side view of a gripper of the coupling.

Referring to FIG. 5, gripper 14 is made of phosphor bronze and is an annular ring 40 having fingers 42 extending rearwardly therefrom.

The annular ring 40 has an inner diameter sized so as to closely fit over the pipe 24 and an outer diameter sized so as to closely fit within the intermediate portion 30 of the coupling body 12. The annular ring 40 has at a forward end a sloped forward face 44 such that the axial length of the annular ring 40 at an interior surface is less than that at an exterior surface. This sloped forward face 44 assists in forcing the gasket 16 onto the pipe 24 during use.

Eight circumferentially spaced fingers 42 extend rearwardly from a rearward end of the annular ring 40 of the gripper 14. Each finger 42 has a neck 46 and a head 48. The neck 46 is of rectangular cross-section and has a reduced thickness so as to allow it to flex during use, thereby allowing the head 48 to be displaced radially during use.

Each head 48 of the fingers 42 of the gripper 14 includes an exterior protrusion 50 which is shaped to fit the gripper retaining groove 36 of the coupling body 12. The protrusion 50 has a blunt forward surface 52 which abuts the square forward face 37 of the gripper retaining groove 36 to resist movement of the gripper 14 out of the coupling body 12 once it is installed therein and a sloped rearward surface 54. The sloped rearward surface 54

30 engages the gripper constricting slope 34 of the coupling body such that as the gripper 14 is moved rearwardly, the sloped rearward surface 54 slides along the gripper constricting slope 34, thereby displacing the heads 48 of the fingers 42 inwardly.

Each head 48 also includes on its interior surface, teeth 56 designed to bite into the pipe 24 when the head 48 is displaced inwardly against the pipe 24. These teeth 56 are Buttress style such that once they engage an outer surface of the pipe 24, any axial force on the pipe tending to pull it out of the coupling 10 will result in the teeth 56 biting more deeply into the outer surface of the pipe 24.

Eight fingers 42 are provided along the periphery of the gripper 14. It is to be noted however that the number of fingers may be varied depending on the particular application, as will be understood by persons in the trade.

Gasket

Figure 6:
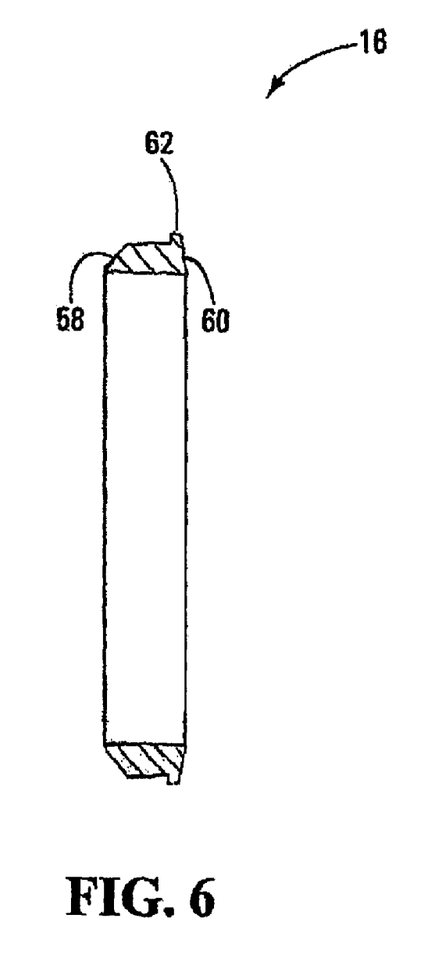
FIG. 6 is a side cross-sectional view of a gasket of the coupling.

Referring to FIG. 6, the gasket 16 is made of nitrile rubber and is an annular ring having a substantially trapezoidal cross-section. An inner diameter of the gasket 16 is chosen so as to closely fit over the pipe 24. An outer diameter of the gasket is chosen so as to closely fit within the coupling body 12.

Both a forward end 58 and a rearward end 60 of the gasket 16 are sloped such that the axial length of the gasket 16 is greater at its radially inner surface than at its outer surface. In the preferred embodiment the angle of the slope of the forward end 58 is approximately 45 degrees while the angle of the slope of the rearward end 60 is approximately 10 degrees. The slopes of the forward end 58 and rearward end 60 cooperate with a sloped portion of the adapter 18 and the sloped face 44 of the gripper 14 respectively, to press the gasket 16 into the pipe 24 once the coupling body 12 is tightened onto the stub 22.

The gasket is also provided on its exterior surface with a circumferential protrusion 62 having a profile adapted to fit within the gasket retaining groove 38.

Adapter

Figure 7:
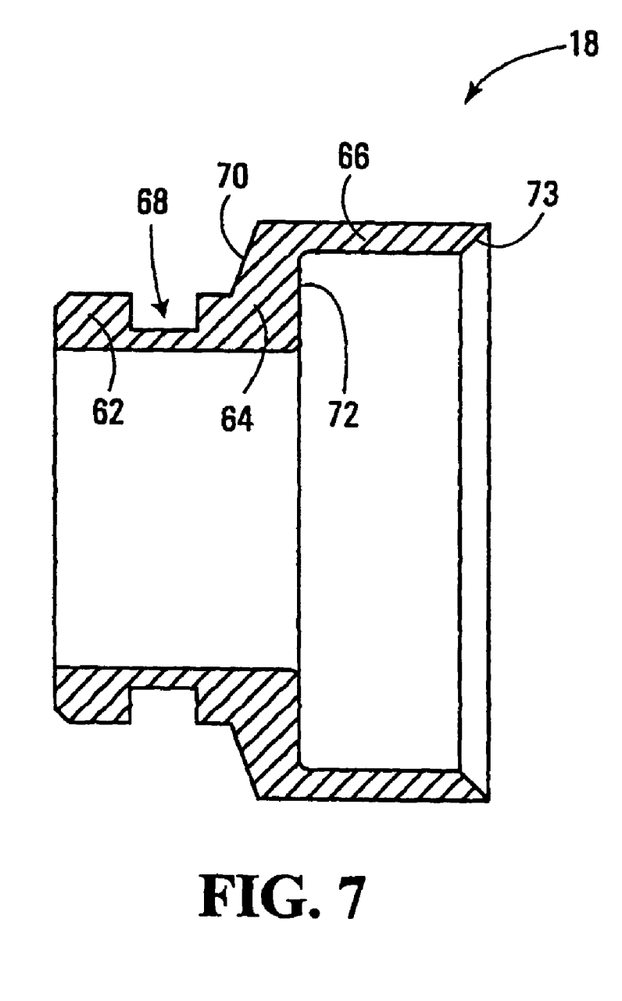
FIG. 7 is a side cross-sectional view of an adapter of the coupling.

Referring to FIG. 7, the adapter 18 is made of copper alloy and consists, moving from its forward end to its rearward end, of an inner web 62, an intermediate section 64 and an outer web 66.

The inner web 62 is of a smaller diameter than the outer web 66 and its exterior surface is sized to fit closely within an inner surface of the stub 22. The inner web also has on its outer surface a circumferential seal groove 68 shaped and sized to accommodate the seal 20.

The intermediate section 64 connects the inner web 62 and the outer web 66, has a forward face 70 shaped to engage a rearward end face of the stub 22, and a rearward face 72 shaped to engage a forward end face of the pipe 24.

The outer web 66 is sized such that its outer surface closely fits within the coupling body 12 and its inner surface closely fits over the pipe 24. A rearward face 73 of the outer web 66 is angled 45 degrees so as to engage the sloped forward end 58 of the gasket 16.

Use

A description of an exemplary manner in which the coupling of the present invention may be used is set out below.

Referring to FIGS. 2 and 3, first, the coupling body 12, gripper 14 and gasket 16 are assembled. To do so, the gripper 14 is slid into the forward end of the coupling body 12 with the fingers 42 of the gripper 14 pointed rearwardly. This step can be performed either manually, or using an insertion device. The sloped rearward surface 54 of the fingers 42 of the gripper 14 assist in inserting the gripper 14 within the coupling body 12 and serve to displace the heads 48 of the fingers 42 slightly inwardly since the exterior diameter of the exterior protrusions 50 of the heads 48 is slightly greater than the diameter of the inner surface of the intermediate section 30 of the coupling body 12.

The gripper 14 is pushed into the coupling body 12 until the exterior protrusions 50 of the heads 48 of the fingers 42 of the gripper 14 reach the gripper retaining groove 36 on the interior surface of the coupling body 12 at which point the resiliency of the necks 46 of the fingers 42 cause the heads 48 to expand to their original positions. Once in this position, the gripper 14 is locked in place as the blunt forward faces 52 of the heads 48 abut against the square forward surface 41 of the gripper retaining groove 36 in the coupling body 12, and the sloped rearward surfaces 54 of the heads 48 abut against the gripper constricting slope 34 of the coupling body 12.

The gasket 16 is then inserted into the coupling body 12 in the same manner until the sloped rearward end 60 of the gasket abuts against the sloped forward face 44 of the gripper 14, and the exterior protrusion 62 of the gasket 16 engages the gasket retaining groove 38 in the coupling body 12. The gasket 16 is retained in place by the engagement of the exterior protrusion 62 of the gasket 16 into this retaining groove 38.

Thus, once the gripper 14 and the gasket 16 are positioned within the coupling body 12 as described, the gripper 14 and gasket 16 are held in place and will not fall out under normal handling. Neither the gripper 14 nor the gasket 16 will lock in place if inserted in an incorrect orientation.

The assembly of the coupling body 12, gripper 14 and gasket 16 may be performed at the factory such that the user receives a preassembled unit, or the user may assemble these elements just prior to use. Once the coupling body 12, gripper 14 and gasket 16 are assembled into an assembled coupling body, the only remaining loose part of the coupling 10 is the adapter 18 which comes preassembled with the seal 20 mounted thereon.

Referring to FIG. 1, at a work site, the adapter 18 is first inserted into the fitting stub 22 such that the inner web 62 of the adapter 18 resides within the end of the stub 22. The adapter 18: is slid into the stub 22 until the rearward end face of the stub 22 engages the forward face 70 of the intermediate section 64 of the adapter 18. In this position, the seal 20 creates a seal against the stub 22 thereby preventing leakage of fluid out the forward end of the coupling.

The coupling body assembly is then placed over the adapter 18 such that the forward end of the coupling body 12 slides over the outer web 66 of the adapter 18 until the internal threading 31 of the nut section 26 of the coupling body 12 first engages the exterior threading 33 of the stub 22. The coupling body 12 is then hand-tightened onto the stub 22, thereby further engaging the interior threading 31 of the coupling body 12 and the exterior threading 33 of the stub 22, and moving the coupling body 12 further over the adapter 18 and the stub 22. Typically, the coupling body 12 is hand-tightened onto the stub 22 until the rearward face 73 of the outer web 66 of the adapter 18 abuts against the forward end 58 of the gasket 16, thereby creating some resistance to further tightening.

The pipe 24 is then "stab-fitted" into the rearward opening of the coupling body 12 and pushed forward until the forward end face of the pipe 24 abuts against the rearward face 72 of the intermediate section 64 of the adapter 18.

The coupling body 12 is then further tightened onto the stub 22 either by hand or by using a tool. Because the stub 22, the adapter 18, the gasket 16, the gripper 14 and the interior constriction 32 of the coupling body 12 all abut against one another, this further tightening causes the gasket 16 and the gripper 14 to move and compress to accommodate the decreasing distance between the rearward face 73 of the outer web 66 of the adapter 18 and the gripper-constricting slope 34.

First, this further tightening causes the gasket 16 to move rearwardly slightly. Additionally, as a result of the cooperation between the sloped surfaces of the rearward face 73 of the outer web 66 and the forward end 58 of the gasket 16, and between the sloped forward face 44 of the gripper 14 and the rearward end 60 of the gasket 16, decreasing the distance between the adapter 18 and the gripper 14 results in the gasket 16 being urged inwardly against the pipe thereby creating a seal against the pipe, preventing leakage out the rearward end of the coupling 10. Both effects are illustrated in the bottom half of FIG. 1.

Second, decreasing the distance between the rearward face 73 of the outer web 66 of the adapter 18 and the gripper constricting slope 34 causes the gripper 14 to move rearwardly. As it does so, cooperation between the sloped rearward surface 54 of the fingers 42 of the gripper 14 and the gripper constricting slope 34 of the coupling body 12 causes the heads 48 of the fingers 42 to be urged inwardly, thereby resulting in an engagement of the outer surface of the pipe 24 by the teeth 56 of the heads 48 of the gripper 14.

Further tightening of the coupling body 12 onto the stub 22 causes the gasket 16 to be urged more securely against the pipe 24 and also causes the teeth 56 of the heads 48 of the gripper 14 to engage the outer surface of the pipe 24 more securely.

Once the forward flat face 35 of the nut section 26 of the coupling body 12 abuts the rearward face 37 of the shoulder 39 of the stub 22, the coupling 10 is fully engaged and a sealed, secured connection between the pipe 24 and the stub 22 has been established. As designed, an ideal seal, and securement is established by the coupling 10 when the coupling body 12 is fully tightened onto the nut with the forward flat face 35 of the nut section 26 of the coupling body abutting the rearward face 37 of the shoulder 39 of the stub 22. Thus, it is easy for a user to tell if the coupling 10 is undertightened, and it is not possible for the coupling 10 to be over-tightened.

To release the connection, the coupling body 12 is simply loosened off the stub 22 thereby disengaging the gasket 16 as well as the teeth 56 of the gripper 14 from the pipe 24. The coupling body assembly can then be removed from the stub 22 and the pipe 24 can be slid out of the coupling body assembly.

Because none of the elements of the coupling are permanently deformed during use, the coupling 10 can be reused.

Although an exemplary manner of using the coupling of the present invention has been described above in detail, it is to be understood that the coupling can be used in ways other than as explicitly set out above, as readily understood by those skilled in the art. For example, instead of mounting the adapter 18 within the stub 22 first and placing the assembled coupling body over the adapter, the adapter 18 can be placed within the coupling body assembly first and then the coupling body assembly with adapter 18 within may be placed onto the stub 22. As a further example, the pipe 24 may be inserted is into the coupling body assembly first before the adapter 18 is installed in the coupling body 12, or the coupling body assembly placed over the adapter 18 and stub 22.

Although the coupling has been described above as being used to attach a PVC pipe 24 to a fitting, it is to be understood that pipes made of other materials may be used, galvanized steel, copper or polyethylene for example. Indeed any pipe having sufficient rigidity to avoid excessive deformation during tightening and which has a surface soft enough to permit the teeth 56 of the gripper 14 to bite into it, may be used. For additional pull-out restraint a stiffener (either integral to the coupling or as a separate element) can be inserted into the end of the pipe 24.

Specific materials used for the various elements of the coupling 10 and for the fitting 22 have been provided. However, it is to be understood that other suitable materials may be used for these elements as will be understood by those skilled in the art.

Very specific geometries of the various elements have also been provided. However, it is to be understood that other suitable geometries may be used by persons skilled in the art without necessarily departing from the scope of the invention.

The coupling has also been described in the context of a waterworks application. However, it is to be understood that the coupling can be used in other applications, plumbing applications for example.

Numerous modifications and variations of the present invention are possible in light of the above teachings. It is therefore to be understood that within the scope of the appended claims, the invention may be practiced otherwise than as specifically described herein.

The invention claimed is:

1. A coupling creating a fluid-conducting connection between a pipe and a stub, said coupling comprising:
   a coupling body having a forward end for being secured to the stub, a rearward end for receiving the pipe, and an internal bore therethrough;
   stub securing means for securing the forward end of the coupling body to the stub;
   a gripper located within the internal bore of said coupling body for gripping the pipe;
   gripper retaining means for retaining said gripper within said coupling body during handling of the coupling body in a condition where there is no stub and no pipe connected in the coupling;
   a gasket located within the internal bore of said coupling body for creating a seal around the pipe;
   gasket retaining means for retaining said gasket within said coupling body during handling of the coupling body in a condition where there is no stub and no pipe connected in the coupling;
   gripper engaging means for causing the gripper to grip the pipe;
   gasket engaging means for causing the gasket to create a seal around the pipe; and
   wherein the coupling body is a unitary component and the gasket retaining means is a gasket retaining recess formed in an interior surface of the coupling body for receiving at least a portion of said gasket therein.

2. The coupling of claim 1 wherein the gripper retaining means is a gripper retaining recess formed in an interior surface of the coupling body for receiving at least a portion of said gripper therein.

3. The coupling of claim 2 wherein the gripper retaining recess is a circumferential groove formed in the interior surface of the coupling body.

4. The coupling of claim 2 wherein the gripper has a radially exterior protrusion for being received within the gripper retaining recess.

5. The coupling of claim 1 wherein the gasket retaining recess is a circumferential groove formed in the interior surface of the coupling body.

6. The coupling of claim 1 wherein the gasket has a radially exterior protrusion for being received within the gasket retaining recess.

7. The coupling of claim 1 wherein the gripper is sized to fit between an interior surface of the coupling body and an outer surface of the pipe once the pipe is received within the rearward end of the coupling body.

8. The coupling of claim 1 wherein the gripper is an annular ring having fingers extending rearwardly therefrom.

9. The coupling of claim 8 wherein the gripper has at least three fingers spaced circumferentially around the annular ring.

10. The coupling of claim 8 wherein the gripper has at least five fingers spaced circumferentially around the annular ring.

11. The coupling of claim 8 wherein the gripper has at least eight fingers spaced circumferentially around the annular ring.

12. The coupling of claim 8 wherein each of the fingers of the gripper has a neck of reduced thickness in a radial direction and a head located rearwardly of the neck.

13. The coupling of claim 12 wherein the neck of each of the fingers is resilient allowing the head attached to it to be resiliently displaced radially inwardly.

14. The coupling of claim 13 wherein the head of each of the fingers has at least one tooth on its radially inner surface for gripping the pipe.

15. The coupling of claim 13 wherein the head of each of the fingers has a radially external protrusion, and the gripper retaining means comprises a circumferential groove formed in an interior surface of the coupling body and the engagement of the radially external protrusion of the head of each of the fingers with said circumferential groove.

16. The coupling of claim 13 wherein a rearward surface of each of said heads is sloped such that an axial length of said head is greater at a radially interior surface, than at a radially exterior surface, the coupling body has an annular constriction at its rearward end sized to closely fit over the pipe, the forward surface of said annular construction being sloped so as to substantially match the slope of the rearward surface of each of said heads, said gripper engagement means comprising positioning the gripper with its sloped rearward surface abutting the sloped forward surface of the annular constriction of the coupling body, and applying a compressive force between the gripper and the annular construction such that the heads of the fingers of the gripper are resiliently urged radially inwardly as the gripper moves rearwardly and the sloped rearward surface of the gripper slides along the sloped forward surface of the annular constriction, causing at least one tooth on an interior surface of said heads to grip an outer surface of the pipe.

17. The coupling of claim 16 wherein the head of each of the fingers has a radially external protrusion, and the gripper retaining means comprises a circumferential groove formed in an interior surface of the coupling body, the engagement of the radially external protrusion of the head of each of the fingers with said circumferential groove, and the abutting of the sloped rearward surface of the head against the sloped forward surface of the annular constriction.

18. The coupling of claim 1 wherein the gasket is an annular ring.

19. The coupling of claim 1 wherein the gasket is sized to fit between an interior surface of the coupling body and an outer surface of the pipe once the pipe is received within the rearward end of the coupling body.

20. The coupling of claim 1 wherein the gasket is positioned within the coupling body forward of, and abutting against, the gripper.

21. The coupling of claim 1 wherein the stub securing means comprises an interior surface of a forward portion of the coupling body being sized and threaded to threadedly engage an external threading of the stub.

22. A coupling creating a fluid-conducting connection between a pipe and a stub, said coupling comprising:
a coupling body having a forward end for being secured to the stub, a rearward end for receiving the pipe, and an internal bore therethrough;
stub securing means for securing the forward end of the coupling body to the stub;
a gripper located within the internal bore of said coupling body for gripping the pipe;
gripper retaining means for retaining said gripper within said coupling body during handling of the coupling body in a condition where there is no stub and no pipe connected in the coupling;
a gasket located within the internal bore of said coupling body for creating a seal around the pipe;
gasket retaining means for retaining said gasket within said coupling body during handling of the coupling body in a condition where there is no stub and no pipe connected in the coupling;
gripper engaging means for causing the gripper to grip the pipe;
gasket engaging means for causing the gasket to create a seal around the pipe; and
wherein the gasket engagement means comprises a sloped rearward surface on said gasket such that an axial length of the gasket at an interior surface is greater than that at an exterior surface, a sloped forward surface on said gripper which substantially matches the slope of said sloped rearward surface of said gasket, positioning the gasket immediately forward of a forward end of said gripper such that the sloped rearward surface of said gasket abuts against said sloped forward surface of said gripper, and applying a compressive force between the, gasket and the gripper such that the gasket is urged tightly against the outer surface of the pipe by a cooperation between the sloped rearward surface of the gasket and the sloped forward surface of the gripper.

23. A coupling creating a fluid-conducting connection between a pipe and a stub, said coupling comprising:
a coupling body having a forward end for being secured to the stub, a rearward end for receiving the pipe, and an internal bore therethrough;
stub securing means for securing the forward end of the coupling body to the stub;
a gripper located within the internal bore of said coupling body for gripping the pipe;
gripper retaining means for retaining said gripper within said coupling body during handling of the coupling body;
a gasket located within the internal bore of said coupling body for creating a seal around the pipe;
gasket retaining means for retaining said gasket within said coupling body during handling of the coupling body;
gripper engaging means for causing the gripper to grip the pipe;
gasket engaging means for causing the gasket to create a seal around the pipe; and
an adapter having a forward end and a rearward end, positioned forward of both the gripper and the gasket;
wherein the rearward end of the adapter is an annular outer flange sized to fit between an interior surface of the coupling body and an outer surface of the pipe once the pipe is received within the rearward end of the coupling body;
wherein a rearward surface of said outer flange of said adapter abuts against a forward surface of the gasket; and
wherein the gasket engagement means comprises a sloped forward surface on said gasket such that an axial length of the gasket at an interior surface is greater than that at an exterior surface, a sloped rearward surface on the outer flange of the adapter which substantially matches the slope of said sloped forward surface of said gasket, positioning the adapter immediately forward of a forward end of said gasket such that the sloped forward surface of said gasket abuts against said sloped rearward surface of said outer flange, and applying a compressive force between the adapter and the gasket such that the gasket is urged tightly against the outer surface of the pipe by a, cooperation between the sloped forward surface of the gasket and the sloped rearward surface of the outer flange.

24. The coupling of claim 23 wherein the gasket engagement means further comprises a sloped rearward surface on said gasket such that an axial length of the gasket at an interior surface is greater than that at an exterior surface, a sloped forward surface on said gripper which substantially matches the slope of said sloped rearward surface of said gasket, positioning the gasket immediately forward of a forward end of said gripper such that the sloped rearward surface of said gasket abuts against said sloped forward surface of said gripper, and applying a compressive force between the gasket and the gripper such that the gasket is urged tightly against the outer surface of the pipe by a cooperation between the sloped rearward surface of the gasket and the sloped forward surface of the gripper.

25. A coupling for creating a fluid-conducting connection between a pipe and a stub, said coupling comprising:
 a unitary coupling body having a forward end for being secured to the stub, a rearward end for receiving the pipe, and an internal bore therethrough;
 stub securing means for securing the forward end of the coupling body to the stub;
 a gripper located within the internal bore of said coupling body for gripping the pipe;
 a gasket located within the internal bore of said coupling body for creating a seal around the pipe;
 said internal bore of said coupling body having a shoulder engagable with a shoulder on the gripper and located between the shoulder on the gripper and said forward end of said coupling body, said internal bore further including a frustoconical surface engageable with a corresponding frustoconical surface on said gripper and located between said frustoconical surface on said gripper and said rearward end of said coupling body, said internal bore further including an annular groove receiving a protrusion extending radially outwardly from said gasket to retain said gasket within the coupling body.

* * * * *